United States Patent
Choo

(10) Patent No.: US 7,499,101 B2
(45) Date of Patent: Mar. 3, 2009

(54) INVERSE IMAGE REVERSING APPARATUS OF A MOBILE COMMUNICATION TERMINAL WITH INTEGRATED PHOTOGRAPHIC APPARATUS AND METHOD THEREOF

(75) Inventor: Zhi-Min Choo, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 895 days.

(21) Appl. No.: 10/724,375

(22) Filed: Nov. 26, 2003

(65) Prior Publication Data
US 2004/0110541 A1    Jun. 10, 2004

(30) Foreign Application Priority Data
Nov. 29, 2002    (KR)    ............. 10-2002-0075478

(51) Int. Cl.
*H04N 5/222*    (2006.01)
*H04N 5/225*    (2006.01)

(52) U.S. Cl. ............. 348/376; 348/373; 348/375; 348/333.06

(58) Field of Classification Search ......... 348/373–376, 348/333.06; 455/556.1
See application file for complete search history.

(56) References Cited

U.S. PATENT DOCUMENTS

| | | | | |
|---|---|---|---|---|
| 4,086,519 A | * | 4/1978 | Persson | 318/400.38 |
| 5,903,706 A | * | 5/1999 | Wakabayashi et al. | 386/117 |
| 6,069,648 A | * | 5/2000 | Suso et al. | 348/14.02 |
| 6,466,202 B1 | * | 10/2002 | Suso et al. | 345/169 |
| 6,630,958 B2 | * | 10/2003 | Tanaka et al. | 348/333.06 |
| 6,658,272 B1 | * | 12/2003 | Lenchik et al. | 455/575.1 |
| 6,687,117 B2 | * | 2/2004 | Liu et al. | 361/504 |
| 6,785,935 B2 | * | 9/2004 | Ahn et al. | 16/221 |
| 6,791,597 B2 | * | 9/2004 | Ando et al. | 348/14.02 |
| 6,865,406 B2 | * | 3/2005 | Park | 455/575.3 |
| 6,876,379 B1 | * | 4/2005 | Fisher | 348/14.02 |
| 6,879,337 B2 | * | 4/2005 | Tatehana et al. | 348/14.02 |
| 6,882,726 B2 | * | 4/2005 | Kim | 379/433.13 |
| 6,992,699 B1 | * | 1/2006 | Vance et al. | 348/207.99 |
| 7,046,287 B2 | * | 5/2006 | Nishino et al. | 348/333.06 |
| 7,084,919 B2 | * | 8/2006 | Shibata et al. | 348/333.06 |
| 7,184,092 B2 | * | 2/2007 | Lim | 348/376 |
| 7,215,355 B2 | * | 5/2007 | Kim | 348/14.02 |
| 2002/0065102 A1 | * | 5/2002 | Miyake et al. | 455/556 |
| 2002/0187818 A1 | * | 12/2002 | Kang | 455/575 |
| 2005/0248678 A1 | * | 11/2005 | Kawai et al. | 348/333.06 |

* cited by examiner

*Primary Examiner*—David L Ometz
*Assistant Examiner*—Richard M Bemben
(74) *Attorney, Agent, or Firm*—Lee Hong Degerman Kang & Waimey

(57) ABSTRACT

A mobile communication terminal with an integrated photographic apparatus is disclosed. The photographic apparatus is rotatively connected to the terminal. Further, a magnet, which generates a flux, is connected to the photographic apparatus. A magnetic flux sensor is also connected to the terminal so that an image produced by the photographic apparatus is inverted when the magnetic flux sensor detects the magnetic flux. Rotation of the photographic apparatus at a predetermined angle approximates the magnet to the magnetic flux detecting sensor.

18 Claims, 6 Drawing Sheets

INVERSE IMAGE REVERSING APPARATUS OF A MOBILE COMMUNICATION TERMINAL WITH INTEGRATED PHOTOGRAPHIC APPARATUS AND METHOD THEREOF

CROSS REFERENCE TO RELATED APPLICATIONS

Pursuant to 35 U.S.C. § 119(a), this application claims the benefit of earlier filing date and right of priority to the Korean Patent Application No. 2002-75478, filed on Nov. 29, 2002, the content of which is hereby incorporated by reference in its entirety.

BACKGROUND OF THE INVENTION

1. Field of the Invention

The present invention relates to an image reversing apparatus of a mobile communication terminal with an integrated photographic apparatus and method thereof, and more particularly, to an image reversing apparatus of a mobile communication terminal with an integrated photographic apparatus and method thereof to correctly reproduce an inverted image.

2. Description of Related Art

In general, mobile communication terminals include cellular phones or Personal Communication Systems (PCS) having wireless communication capabilities. As the need for video/image communication emerges along with voice communication, several types of mobile communication terminals with an integrated photographic apparatus have been suggested to satisfy this demand.

Referring to FIG. 1, a folding type mobile terminal 10 is shown with a rotatable camera 16 mounted on the terminal 10. The folding type conventional mobile terminal 10 comprises a body 11, in which a printed circuit board 12 (partially shown) is installed. The terminal further comprises an upper folding portion 13 rotatably coupled to the lower folding portion 11 by using a hinge 15. The camera 16 is mounted at the hinge 15 and can rotate 180°. A liquid crystal display (LCD) screen 14 is mounted on the upper folding portion 13.

Generally, when the rotation angle of the camera 16 is approximately within 330° to 90° (based on 0° corresponding to the twelve o'clock position), such that the camera 16 is generally directed in a direction opposite the LCD screen 14, the reproduced image created by the camera 16 is correctly reproduced on the LCD screen 14 with respect to orientation. However, when the rotation angle of the camera 16 ranges approximately less than 330°, such that the camera 16 is generally directed in the same direction as the LCD screen 14, the reproduced image created by the camera is inversely reproduced on the LCD screen 14 with respect to orientation. In other words, the image is inverted so that it appears upsidedown. Consequently, a correcting apparatus is required to allow for proper image reproduction.

An example of an image correcting apparatus in a mobile communication terminal having an integrated photographic apparatus is described in Japanese Patent No. 3116822, wherein a construction for reversing an inverse image is disclosed. Japanese Patent No. 3116822 describes the use of an angle sensor to detect an angle displacement that is generated when a camera body rotates on the basis of an optical axis of the lens. However, this construction is relatively complicated and large, resulting in increased fabrication cost and possibly degraded accuracy. Therefore, an improved solution is needed to correctly display an inverted image reproduced by a rotating photographic apparatus of a mobile communication terminal.

SUMMARY OF THE INVENTION

Accordingly, the present invention is directed to a mobile communication terminal with an integrated photographic apparatus that substantially obviates one or more problems due to limitations and disadvantages of the related art above.

An object of the present invention is to provide an inverse image reversing apparatus of a mobile communication terminal with an integrated photographic apparatus, wherein construction and cost of fabrication are simplified and reduced, respectively.

Another object of the present invention is to provide an inverse image reversing apparatus of a mobile communication terminal with an integrated photographic apparatus, wherein the accuracy of the reversed inverse image is enhanced.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, there is provided a mobile communication terminal comprising a photographic apparatus rotatively installed on the terminal. Further, a magnet, which generates a flux, is installed on the photographic apparatus. A magnetic flux sensor is also installed on the terminal so that an image produced by the photographic apparatus is inverted when the magnetic flux sensor detects the magnetic flux. Rotation of the photographic apparatus a predetermined angle approximates the magnet to the magnetic flux detecting sensor.

According to one aspect of the present invention, the predetermined angle ranges from approximately 150° to approximately 180°. Also, the inverted image is reproduced on a display installed on the terminal.

According to another aspect of the present invention, the mobile communication terminal is a folding type mobile communication terminal which further comprises a lower body, an upper body having a lower surface, a hinge connection element rotatingly connecting the lower body to the upper body, a display which reproduces the image produced by the photographic apparatus, and a circuit board installed in the lower body. The display is installed on the lower surface of the upper body, and the circuit board receives a signal emitted by the magnetic flux sensor to invert the image produced by the photographic apparatus. Further, the photographic apparatus is rotatively installed on the terminal at the hinge connection element, and the magnetic flux sensor is installed on the circuit board. Finally, the magnet is installed on an inner circumferential surface of the photographic apparatus and may comprise an outer circumferential surface having a curvature approximating a curvature of the inner circumferential surface of the photographic apparatus.

According to another aspect of the present invention, the terminal may further comprise a first "C" shaped guide rail formed on the inner circumferential surface of the photographic apparatus, and a second "C" shaped guide rail formed opposite the first guide rail on the inner circumferential surface of the photographic apparatus a distance approximate to the length of the magnet. The first and second guide rails receive and fixedly secure the magnet to the photographic apparatus.

According to one aspect of an alternative embodiment of the present invention, a mobile communication terminal may comprise a photographic apparatus that is rotatively installed on the terminal. Further, a magnet, which generates a flux, is installed on the photographic apparatus. A magnetic flux sensor is also installed on the terminal so that an image produced by the photographic apparatus is inverted when the magnetic flux sensor does not detect the magnetic flux. Rotation of the photographic apparatus a predetermined angle approximates the magnet to the magnetic flux detecting sensor.

It is to be understood that both the foregoing general description and the following detailed description are exemplary and explanatory and are intended to further describe the invention as claimed.

BRIEF DESCRIPTION OF THE DRAWINGS

The accompanying drawings, which are included to provide a further, understanding of the invention and are incorporated in and constitute a part of this specification, illustrate embodiments of the invention and, together with the description, serve to explain the principles of the invention.

In the drawings.

Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

Reference will now be made in detail to one or more embodiments of the invention, examples of which are illustrated in the accompanying drawings.

Figure 1:
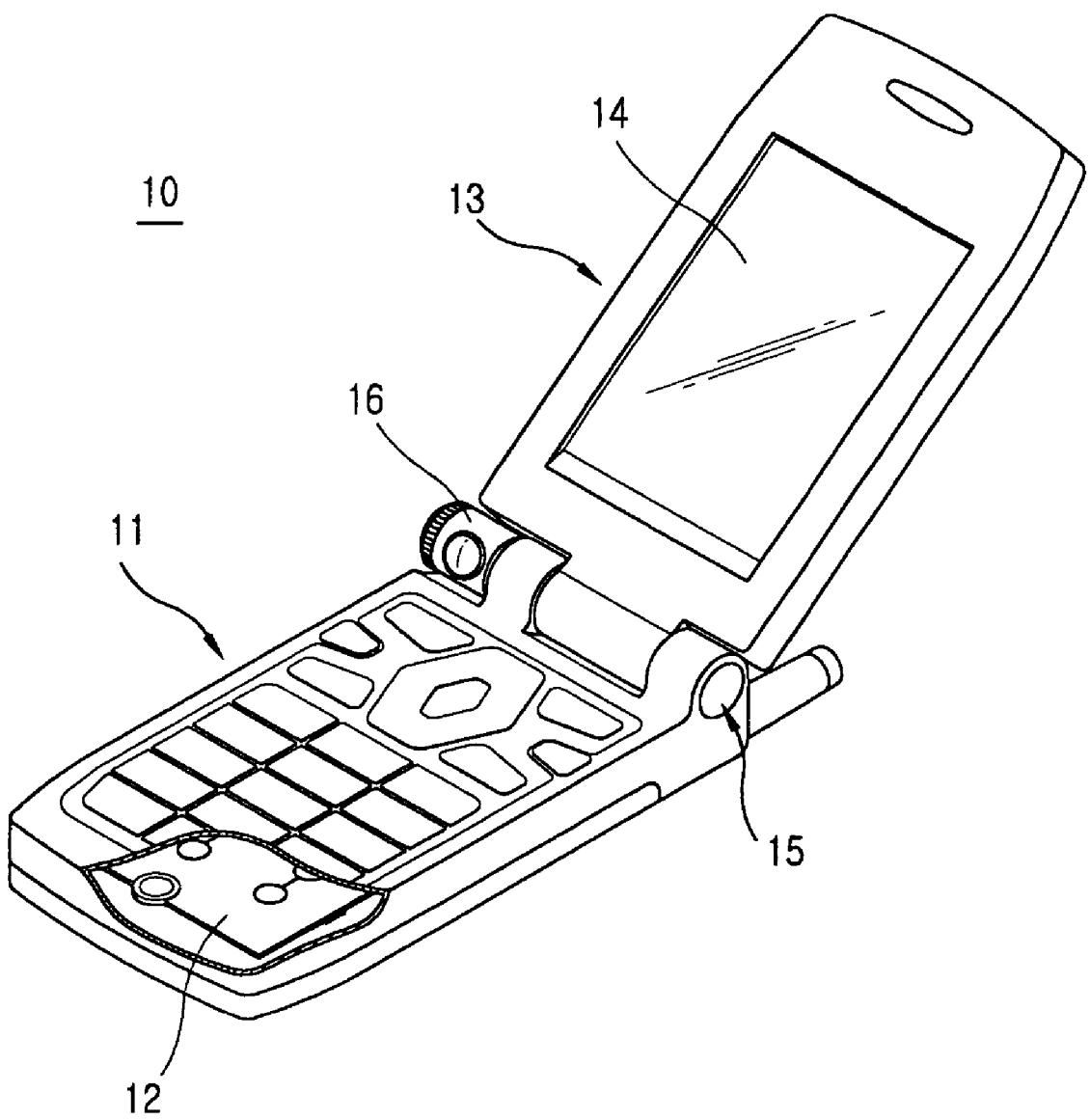
FIG. 1 illustrates a type of a mobile communication terminal with an integrated photographic apparatus according to the related art.
Figure 2:
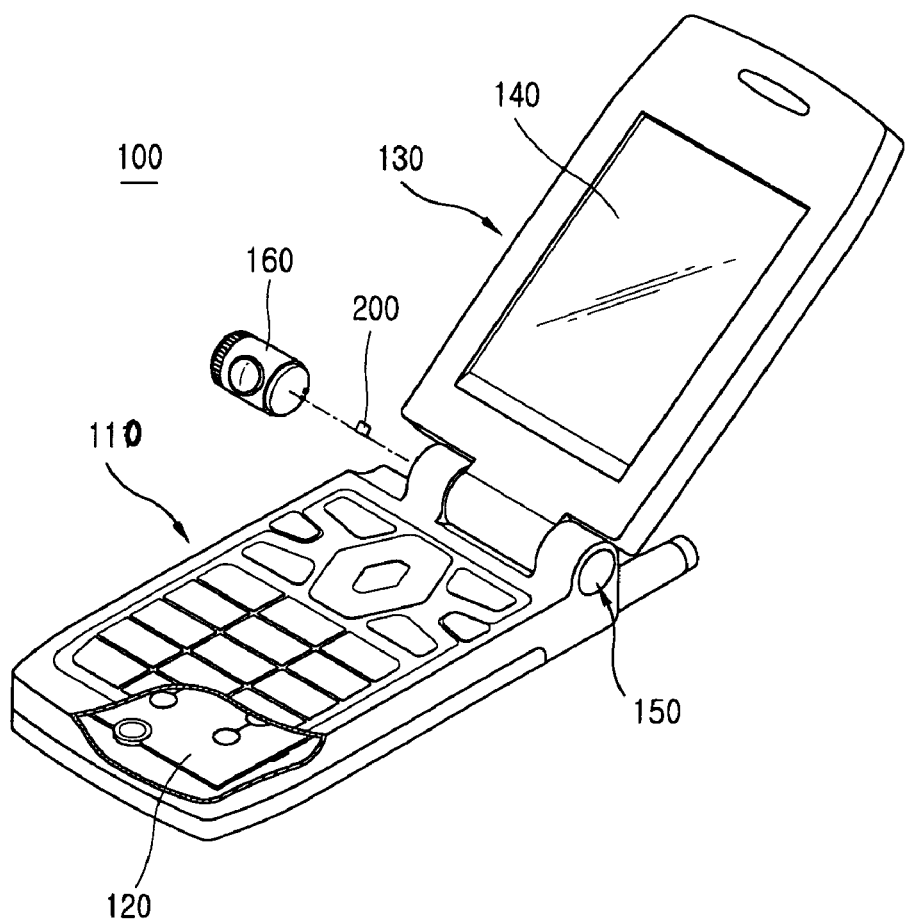
FIG. 2 illustrates a disassembled perspective view of a mobile communication terminal with an integrated photographic apparatus and an inverse image reversing apparatus according to one embodiment of the present invention.

In FIG. 2, a mobile communication terminal 100 with an integrated photographic apparatus 160, in accordance with one embodiment of the present invention, is illustrated as, for example, a folding type terminal. The terminal comprises a lower body 110 in which a printed circuit board 120 is installed. Alternatively, the printed circuit board 120 may be installed in the upper body 130. The upper body 130 is shown to have a display 140, such as a liquid crystal display, on the lower surface of the upper body 130. The photographic apparatus 160 is rotatively installed on one side of a hinge connection element 150, which rotatively connects the upper body 130 to the lower body 110. The photographic apparatus 160 is installed so that it has an approximate range of rotation of 180°.

Figure 3:
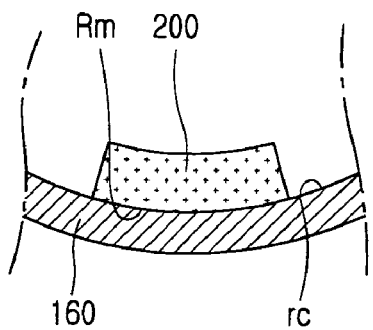
FIG. 3 illustrates a longitudinal sectional view of an integrated photographic apparatus of mobile communication terminal having an inverse image reversing apparatus according to one embodiment of the present invention.

A magnet 200 is preferably fixed to the interior surface of the photographic apparatus 160. However, the magnet 200 can also be fixed on an external surface of the photographic apparatus 160. The magnet 200 is preferably formed in an arc shape in order to widen the magnetic flux continuously emitted by the magnet 200, as well as vary the magnetic flux density (i.e., higher density in the center of the magnet versus lower density towards the edges of the magnet). As shown in FIG. 3, the outer circumferential surface "Rm" of the magnet 200 is preferably curved to approximate the curvature of the inner circumferential surface "rc" of the photographic apparatus. Therefore, the surface contact between the magnet 200 and the photographic apparatus 160 is maximized.

Figure 4:
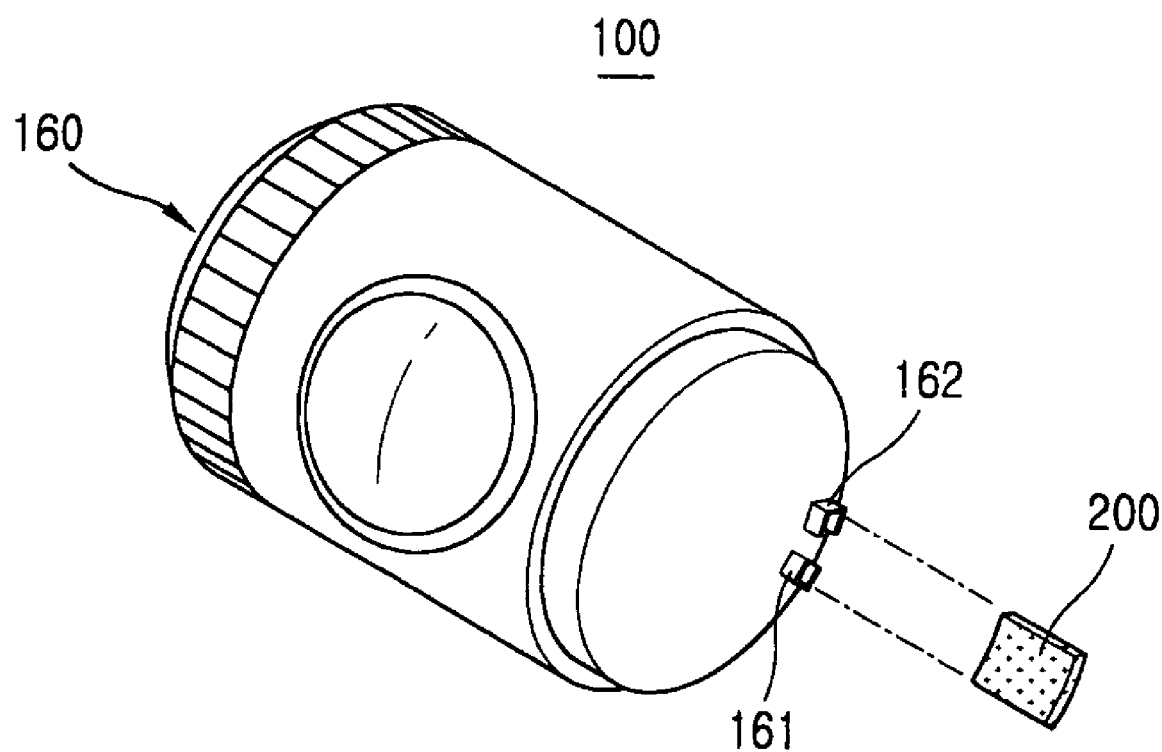
FIG. 4 illustrates a perspective view of an integrated photographic apparatus of a mobile communication terminal and a connection method of a magnet according to one embodiment of the present invention.

Referring to FIG. 4, the magnet 200 is fixed to the photographic apparatus 160. A first guide rail 161 is formed on the inner circumferential surface "rc" of the photographic apparatus 160 opposite a second guide rail 162. The first and second guide rails 161, 162 are approximately "C" shaped and spaced a distance apart in order to receive and fixedly secure the magnet 200. Alternatively, an adhesive well known in the art may be used to secure the magnet 200.

Figure 5:
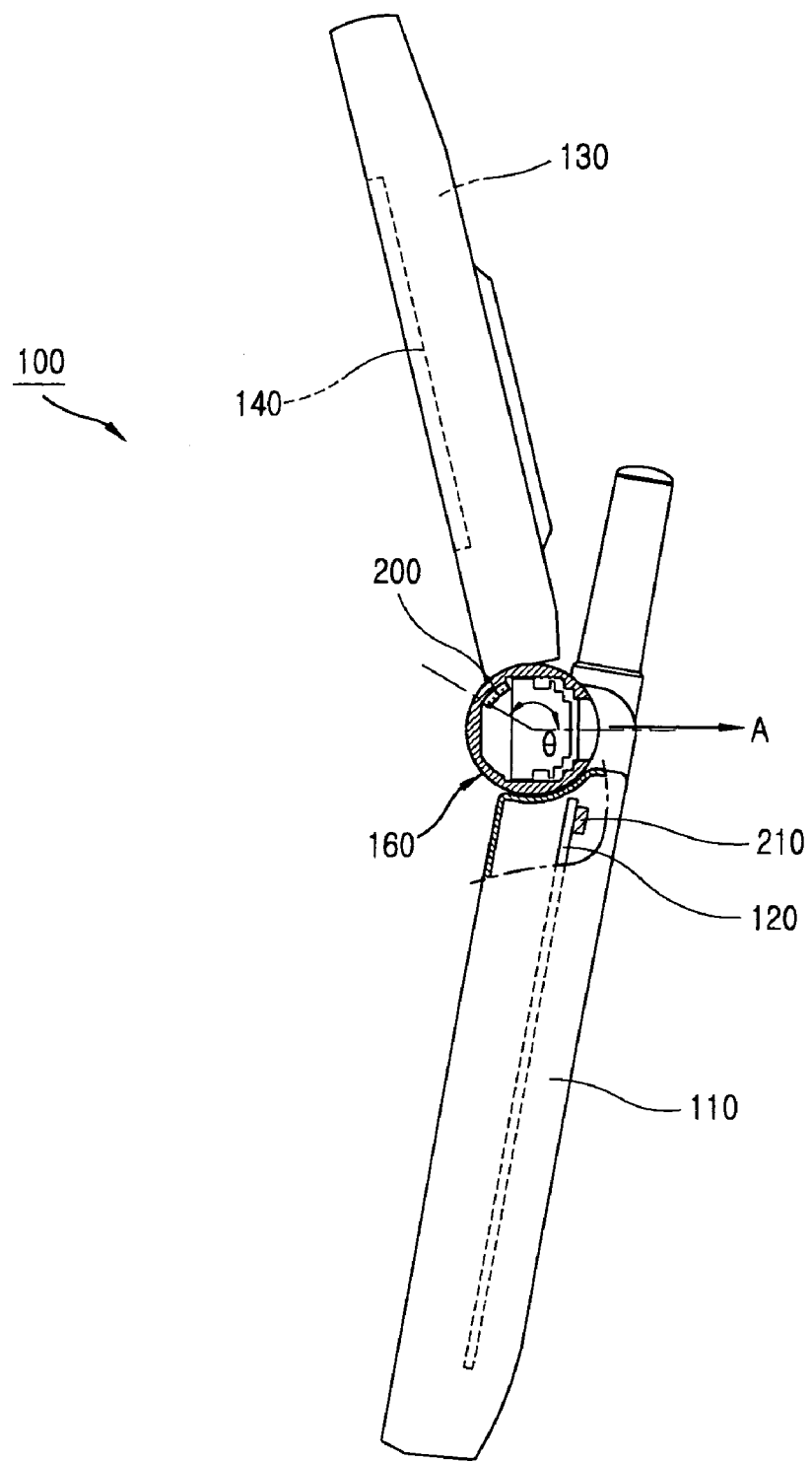
FIG. 5 illustrates a sectional view of a mobile communication terminal with an integrated photographic apparatus directed away from the internal surface of the terminal according to one embodiment of the present invention.

In FIG. 5, a flux detecting sensor 210 is shown fixed to the printed circuit board 120 in the lower body 110 of the terminal 100. The sensor 210 detects the density of the magnetic flux emitted by the magnet 200. The sensor can alternatively be installed in other locations of the terminal 100 in order to detect the magnetic flux density of the magnet 200. When a user rotates the photographic apparatus 160 a predetermined angle, the magnet 200 is displaced from its original position. The magnetic flux sensor 210 detects the flux density variation resulting from the displacement of the magnet 200 and emits a signal to the printed circuit board.

Referring to FIG. 5, when the photographic apparatus is rotated clockwise from approximately 300° (approximately 10 O'clock position) to approximately 90° (approximately 3 O'clock position) (based on 0° corresponding to the twelve O'clock position), the rotation angle θ is less than or equal to approximately 150°. Consequently, when the photographic apparatus 160 is generally oriented in the direction "A" (which corresponds to approximately 90° position), the image created by the photographic apparatus 160 is correctly reproduced on the LCD screen 140 with respect to orientation. Also, when the rotation angle θ is less than or equal to approximately 150° between the approximately 300° and approximately 90° positions, the magnetic flux sensor 210 and magnet 200 are not relatively approximately positioned to each other.

Figure 6:
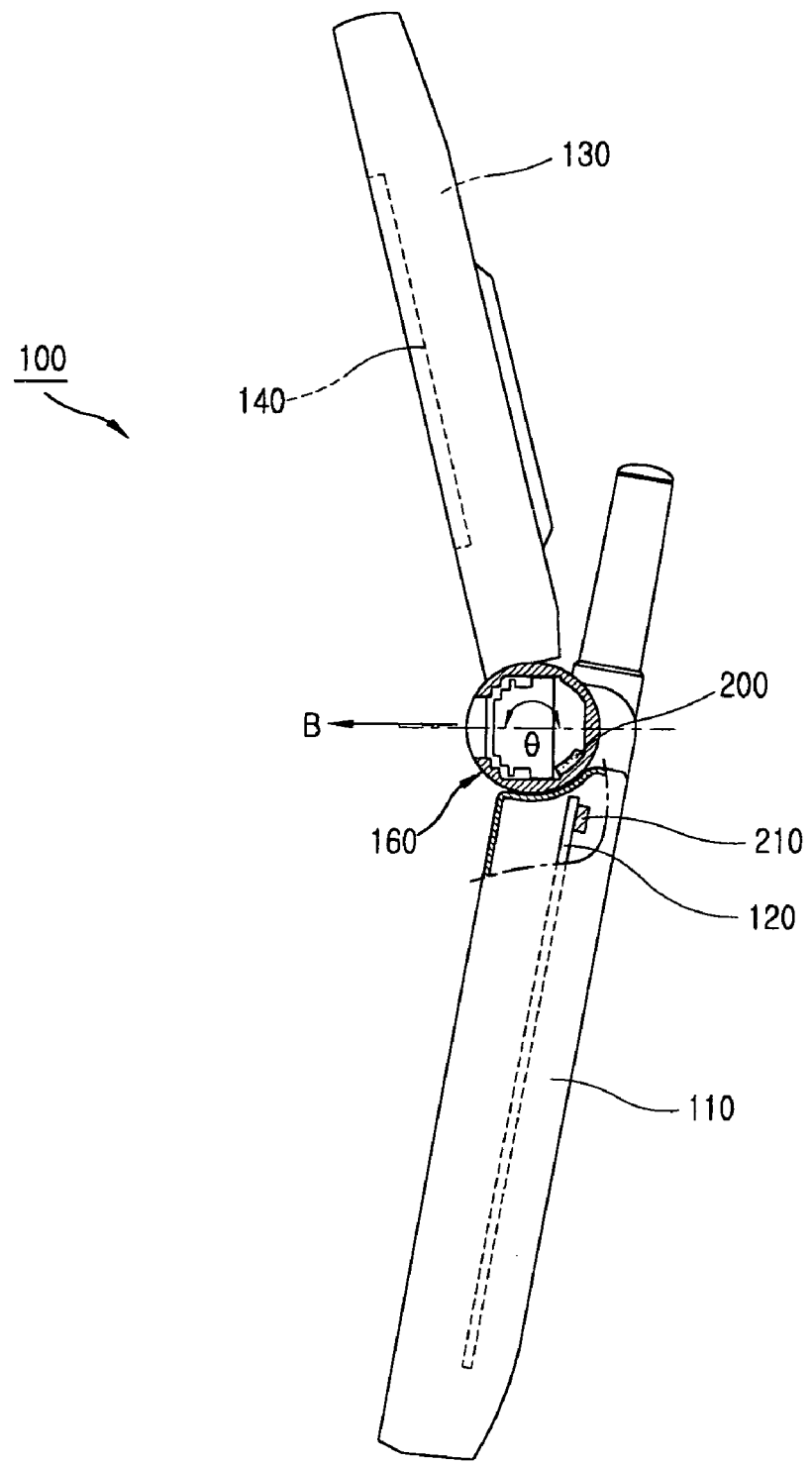
FIG. 6 illustrates a sectional view of a mobile communication terminal with an integrated photographic apparatus directed towards the internal surface of the terminal according to one embodiment of the present invention.

However, when the photographic apparatus 160 is rotated counterclockwise from approximately 300° position to approximately 270° position (based on 0° corresponding to the 12 O'clock position and 270° corresponding to the 9 O'clock position) so that the rotation angle θ exceeds approximately 150°, the photographic apparatus 160 is inversely positioned between the approximately 300° and approximately 270° positions and faces the user (i.e., the photographic apparatus 160 is directed in the same general direction "B" as the LCD screen 140 and corresponds to approximately 270° position), as shown in FIG. 6. Consequently, the image photographed by the photographic apparatus 160 is inverted since the rotation of the photographic apparatus 160 is more than approximately 150°. This results in the photographic apparatus 160 as being oriented upside-down. However, rotation of the photographic apparatus 160 also results in positioning the magnet 200 approximate to the magnetic flux sensor 210. Upon detecting a magnetic flux density, the sensor 210 emits a signal to the printed circuit board 120, which inverts the image to be correctly reproduced on the LCD screen 140.

Figure 7:
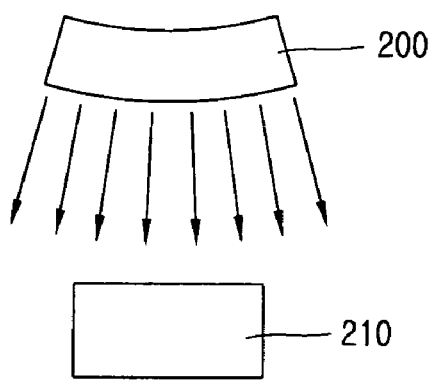
FIG. 7 illustrates a diagram of the flux direction of a magnet in an inverse image reversing apparatus of mobile communication terminal with an integrated photographic apparatus, according to one embodiment of the present invention.
Figure 8:
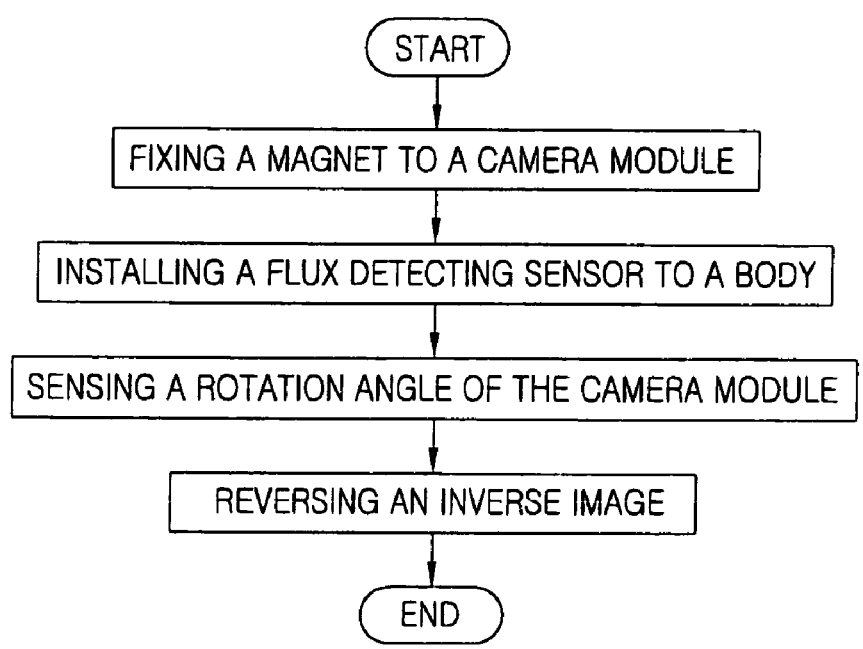
FIG. 8 illustrates sensing a rotation angle of a camera module and reversing an inverse image in an integrated photographic apparatus of a mobile communication terminal according to one embodiment of the present invention.

FIG. 7 illustrates that, due to the arc shape of the magnet 200, the amount of flux directed towards the sensor 210 is maximized. Furthermore, variation in flux density can also be detected by the sensor 210 in order to gradually reorient the reproduced image for greater accuracy. Alternatively, the terminal's software, firmware, or circuitry can be programmed or constructed so that rotation of the photographic apparatus 160 repositions the magnet 200 away from the sensor 210. As a result, the sensor, in detecting a lack of magnetic flux density, signals for inversion of the image.

It will be apparent to those skilled in the art that various modifications and variations can be made in the present invention without departing from the spirit or scope of the invention. Therefore, the foregoing description of these embodiments of the present invention has been presented for the purposes of illustration and description. It is not intended to be exhaustive or to limit the invention to the precise form disclosed. Thus, it is intended that the present invention cover the modifications and variations of this invention provided they come within the scope of the appended claims and their equivalents. Preferred embodiments were shown in the context of folding type mobile communication terminals. In alternative embodiments, candy bar and PDA type terminals can be substituted for the present invention.

What is claimed is:

1. A mobile communication terminal, comprising
    a photographic apparatus rotatably and externally connected to the terminal;
    a display reproducing an image captured by the photographic apparatus;
    a magnet connected to the photographic apparatus, wherein the magnet generates a magnetic flux; and
    a magnetic flux sensor connected to the terminal, wherein the image is inverted when the magnetic flux sensor detects the magnetic flux,
    wherein rotation of the photographic apparatus at a predetermined angle ranging from approximately 150° to approximately 180°, such that the photographic apparatus is directed in substantially the same direction as the display, brings the magnet closer to the magnetic flux sensor, wherein a vertical angle of the photographic apparatus facing upright corresponds to 90° and a horizontal angle of the photographic apparatus facing toward a user of the terminal corresponds to 180°.

2. The terminal of claim 1, wherein the inverted image is reproduced on the display.

3. The terminal of claim 1, wherein the terminal is a folding type mobile communication terminal further comprising:
    a lower body;
    an upper body having a lower surface;
    a hinge connection element rotatably connecting the lower body to the upper body; and
    a circuit board installed in the lower body, wherein the circuit board receives a signal emitted by the magnetic flux sensor to invert the image,
    wherein the display is installed on the lower surface of the upper body.

4. The terminal of claim 3, wherein the photographic apparatus is rotatably connected to the terminal at the hinge connection element.

5. The terminal of claim 4, wherein the magnetic flux sensor is connected to the circuit board.

6. The terminal of claim 4, wherein the magnet is connected to an inner circumferential surface of the photographic apparatus.

7. The terminal of claim 6, wherein the magnet comprises an outer circumferential surface having a curvature approximating a curvature of the inner circumferential surface of the photographic apparatus.

8. The terminal of claim 7, wherein an adhesive fixedly secures the magnet to the photographic apparatus.

9. The terminal of claim 7, further comprising:
    a first "C" shaped guide rail formed on the inner circumferential surface of the photographic apparatus; and
    a second "C" shaped guide rail formed opposite the first guide rail on the inner circumferential surface of the photographic apparatus a distance approximate to the length of the magnet, wherein the first and second guide rails receive and fixedly secure the magnet to the photographic apparatus.

10. A mobile communication terminal, comprising:
    a photographic apparatus rotatably and externally connected to the terminal;
    a display reproducing an image captured by the photographic apparatus;
    a magnet connected to the photographic apparatus, wherein the magnet generates a magnetic flux; and
    a magnetic flux sensor connected to the terminal,
    wherein the image is inverted when the photographic apparatus is rotated in a predetermined angle ranging approximately 0° to approximately 150° and directed in substantially the same direction as the display, displacing the magnet away from the magnetic flux sensor such that the magnetic flux sensor does not detect the magnetic flux, wherein a vertical angle of the photographic apparatus facing upright corresponds to 90°, a horizontal angle of the photographic apparatus facing toward a user of the terminal corresponds to 180° and a horizontal angle of the photographic apparatus facing against the user corresponds to 0°.

11. The terminal of claim 10, wherein the inverted image is reproduced on the display.

12. The terminal of claim 10, wherein the terminal is a folding type mobile communication terminal, the terminal further comprising:
    a lower body;
    an upper body having a lower surface;
    a hinge connection element rotatably connecting the lower body to the upper body; and a circuit board disposed within the lower body, wherein the circuit board receives a signal emitted by the magnetic flux sensor to invert the image, wherein the display is installed on the lower surface of the upper body.

13. The terminal of claim 12, wherein the photographic apparatus is rotatably connected to the terminal at the hinge connection element.

14. The terminal of claim 13, wherein the magnetic flux sensor is connected to the circuit board.

15. The terminal of claim 13, wherein the magnet is connected to an inner circumferential surface of the photographic apparatus.

16. A method for inverting an image produced by a photographic apparatus rotatably and externally connected to a mobile communication terminal, the method comprising:

providing a magnet connected to the photographic apparatus;

providing a magnetic flux sensor connected to the terminal; and inverting the image produced by the photographic apparatus when a magnetic flux generated by the magnet is detected by the magnetic flux sensor, wherein the magnet is brought closer to the magnetic flux sensor when the photographic apparatus is rotated at a predetermined angle at which the photographic apparatus is directed in substantially the same direction as a display of the terminal such that the display displays the inverted image, the predetermined angle ranging from approximately 150° to approximately 180°, wherein a vertical angle of the photographic apparatus facing upright corresponds to 90° and a horizontal angle of the photographic apparatus facing toward a user of the terminal corresponds to 180°.

17. The terminal of claim 1, wherein when a lens of the photographic apparatus is positioned within the predetermined angle, facing a user of the terminal, the image captured by the photographic apparatus is inverted to be correctly reproduced on the display.

18. The terminal of claim 10, wherein when a lens of the photographic apparatus is positioned to face a user of the terminal, the image captured by the photographic apparatus is correctly reproduced on the display without inverting the captured image.

* * * * *